US005788727A

United States Patent [19]

Barthelmess

[11] Patent Number: 5,788,727

[45] Date of Patent: Aug. 4, 1998

[54] CENTRIFUGAL AIR SEPARATOR

[75] Inventor: Ulrich Barthelmess, Niederstotzingen, Germany

[73] Assignee: OMYA GmbH, Germany

[21] Appl. No.: 655,630

[22] Filed: May 30, 1996

[30] Foreign Application Priority Data

Jun. 8, 1995 [DE] Germany ........................ 195 20 845.5

[51] Int. Cl.[6] ........................ B01D 45/14

[52] U.S. Cl. ........................ 55/406; 55/408; 209/139.2; 209/143; 209/713

[58] Field of Search ........................ 55/400, 406, 408; 96/214; 209/133, 139.2, 143, 142, 710, 713, 714, 148

[56] References Cited

U.S. PATENT DOCUMENTS

| | | | |
|---|---|---|---|
| 2,793,710 | 5/1957 | Robinson | 55/406 |
| 3,998,610 | 12/1976 | Leith | 5/400 |
| 4,198,218 | 4/1980 | Erickson | 55/408 |
| 4,295,803 | 10/1981 | Barthelmess | 417/423 R |
| 4,994,097 | 2/1991 | Brouwers | 55/408 |
| 5,025,930 | 6/1991 | Barthelmess | 209/144 |

FOREIGN PATENT DOCUMENTS

| | | | |
|---|---|---|---|
| 805984 | 12/1936 | France | 55/408 |
| 620499 | 10/1935 | Germany | 55/408 |
| 2951819 | 9/1982 | Germany . | |
| 2825400 | 2/1984 | Germany . | |
| 3712136 | 8/1988 | Germany . | |
| 3924826 | 1/1991 | Germany . | |
| 29505311 | 7/1995 | Germany . | |
| 1565496 | 5/1990 | U.S.S.R. | 55/406 |

*Primary Examiner*—C. Scott Bushey
*Attorney, Agent, or Firm*—Londa and Traub LLP

[57] ABSTRACT

A centrifugal air separator with a housing provided with inlets for material to be separated and separating air or a combined material and air inlet, and outlets for air-and-fines mixture and coarse material, in which at least one wheel formed essentially of a crown of buckets is journal ed. The invention addresses the problem of reducing the distance of the bearings of the wheel shaft from one another, in a centrifugal air separator of this type, preferably a separator with fines-and-air aspiration at both ends. According to the invention, the fan wheel is journal ed on a central, fixed axle which is held in the housing and machine frame by arms, struts or other such supports.

16 Claims, 7 Drawing Sheets

CENTRIFUGAL AIR SEPARATOR

BACKGROUND OF THE INVENTION

The invention relates to a centrifugal air separator having a housing provided with inlets for air and the material to be separated or a combined air and material inlet and outlets, one for the fines and air mixture and one for the coarse material, in which at least one fan wheel formed essentially by a ring of buckets or blades is journal ed.

Such a centrifugal air separator, in which one combination air and fines outlet chamber is disposed at both ends of the wheel, is already disclosed in German Federal Patent 2951819. Owing to the two fines outlets this separator has a high throughput with a high fines output and little coarse material in the fines.

It is disadvantageous, however, that this design results in a relatively long and hence heavy axle. This is because the two fines and air outlet chambers are formed each by an elbow-like section of pipe whose diameter corresponds approximately to the wheel diameter. The wheel axle which is the drive shaft of the wheel on both sides is brought through these curved outlet ducts, while the axle pass-through must be sufficiently sealed from the outside atmosphere. At both ends of the axle pass-through bearings must be provided for the axle. A belt pulley or the like is mounted on the upper end of the axle.

The wheel axle as well as the separator wheel must be made solid and relatively massive due to the great axial distance between the bearings in order to achieve the necessary strength and to prevent vibration.

A centrifugal air separator is disclosed in German Federal Patent 2825400 in which the wheel buckets are fastened at both ends to end rings, and the two end rings are mounted at their outer circumference in a hydrostatic, aerostatic and electromagnetic bearing. Such bearings are rather expensive, especially when the end rings are of great diameter.

A centrifugal air separator is also disclosed in German Federal Patent 3712136, in which the wheel is mounted in the housing by means of at least one bearing which can be fluid-cooled, the bearing serving simultaneously as the seal between the wheel axle and the housing. But what this is is a centrifugal air separator with a fines-and-air outlet at only one end, the end plate of the wheel opposite the discharge end being located directly beside a housing wall in which the wheel axle is mounted.

SUMMARY OF THE INVENTION

In contrast, the invention is addressed to the problem, in a centrifugal air separator of the kind described above, preferably a separator with fines and air discharge on both sides, to reduce the length between the bearings of the wheel axle.

The solution of this problem is, according to the invention, to mount the wheel on a central, fixed axle which is held in the housing by means of arms, struts or other such means of support.

Instead of a one-piece drive axle, a rigid, fixed axle is provided, on which the wheel turns. On this wheel-bearing axle the two bearings can be brought very close to one another, i.e., there is less distance between the two bearings.

This eliminates the disadvantages that result from the great length between the former axle bearings.

Conventional bearings can be provided, which must be well sealed against the surrounding space within the wheel, so that no particles of the fine materials can get into the bearing, and vice-versa no lubricant can get into the fines from the bearing.

However, the wheel is mounted on the axle to special advantage by means of electromagnetic bearings. Unlike the electromagnetic mounting of the end rings of a wheel as in German Patent 28 25 400, the electromagnetic mounting on the axle has only a small diameter, so it is significantly cheaper. Air can be fed to the electromagnetic bearing—as it can in any other bearing—through passages in the stationary axle. As it is known, electromagnetic bearings require no lubrication.

However, other nonlubricated bearings can be provided. In general the wheel can be mounted on the axle by means of at least one fluid-cooled bearing.

The driving of the wheel mounted according to the invention on a fixed central axle can be accomplished in various ways.

An advantageous drive can be achieved by providing the outer circumference of the wheel with at least one ring of turbine buckets which are driven circumferentially by at least one turbine nozzle. The air issuing from the turbine, expanded and thus cooled, can then be used for cooling purposes.

Another kind of drive is characterized according to the invention by providing as the driver an electrical starter motor the stator of which is affixed to the axle and its rotor is connected by arms, spokes and the like to the rings bearing the wheel buckets.

BRIEF DESCRIPTION OF THE DRAWINGS

To further explain the invention, embodiments will be described with the aid of the drawing.

DETAILED DESCRIPTION

Figure 1:
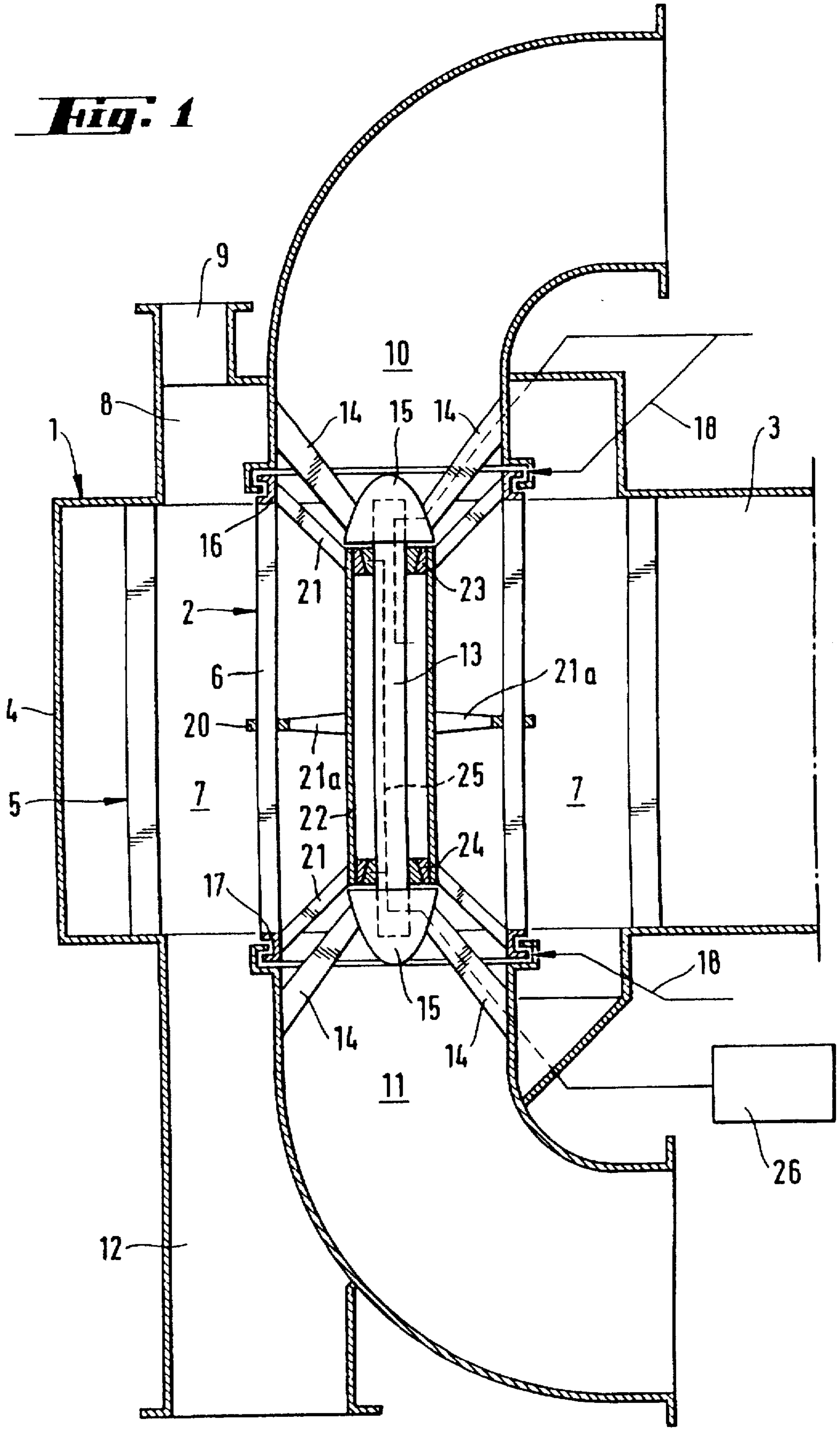
FIG. 1 shows schematically, in longitudinal section, a first embodiment.

The separator has a vertically disposed, substantially cylindrical housing 1 in which a fan wheel 2 can revolve. The separator housing has a tangential air inlet 3 extending over its entire height. An air-guide vane ring 5 is provided at a radial distance from the housing wall 4. Also at a radial distance from the air-guide vane ring is the bucket ring 6 of the separator wheel. The material to be separated is fed downward into the cylindrical separating chamber 7 that extends between the air-guide vane ring 5 and the bucket ring 6, and above the separating chamber there is provided an annular passage 8 for blowing in the material, and a connection 9 leads into it.

At each end of the fan wheel 2 there is an air and fines outlet chamber 10 and 11, and at the bottom end of the separator housing a funnel-shaped coarse material outlet 12 is provided.

According to the invention, the fan wheel is journal ed on a stationary axle 13 which extends along the longitudinal central line of the separator and fan wheel, and which is supported by the housing or frame of the machine.

According to FIGS. 1 to 3, the axle 13 is supported on the housing above and below the wheel 2 by radial arms 14. The radial arms 14 extend at an angle to the radius and reach from the axle 13 and the bosses 15 affixed to the axle to the walls of the fines outlet chambers 10 and 11. Three such supporting arms 14 can be provided, offset at 120° from one another, and having a streamlined configuration.

Top and bottom end rings 16 and 17 of the fan wheel are sealed from the outlet chambers so that, especially no coarse particles will escape from the separating chamber, outside of the fan wheel, and get into the outlet chambers. The seal is provided with compressed-air connections 18.

The end rings 16 and 17 are joined to a sleeve 22 by radial arms 21. Between the upper and lower end rings a supporting ring or spacer ring 20 is provided, which is joined by radial arms 21*a* to the sleeve 22. The sleeve 22 is rotatable on the axle 13, but is not displaceable lengthwise. Compressed air is fed to the bearings 23 and 24 through axial and radial bores 25 in the axle, so that the bearings are protected against the entry of particles. The bearings 23 and 24 can be configured as electromagnetic, aerostatic or hydrostatic bearings. A controller 26 serves for power supply and control for electromagnetic bearings 23 and 24.

Figure 2:
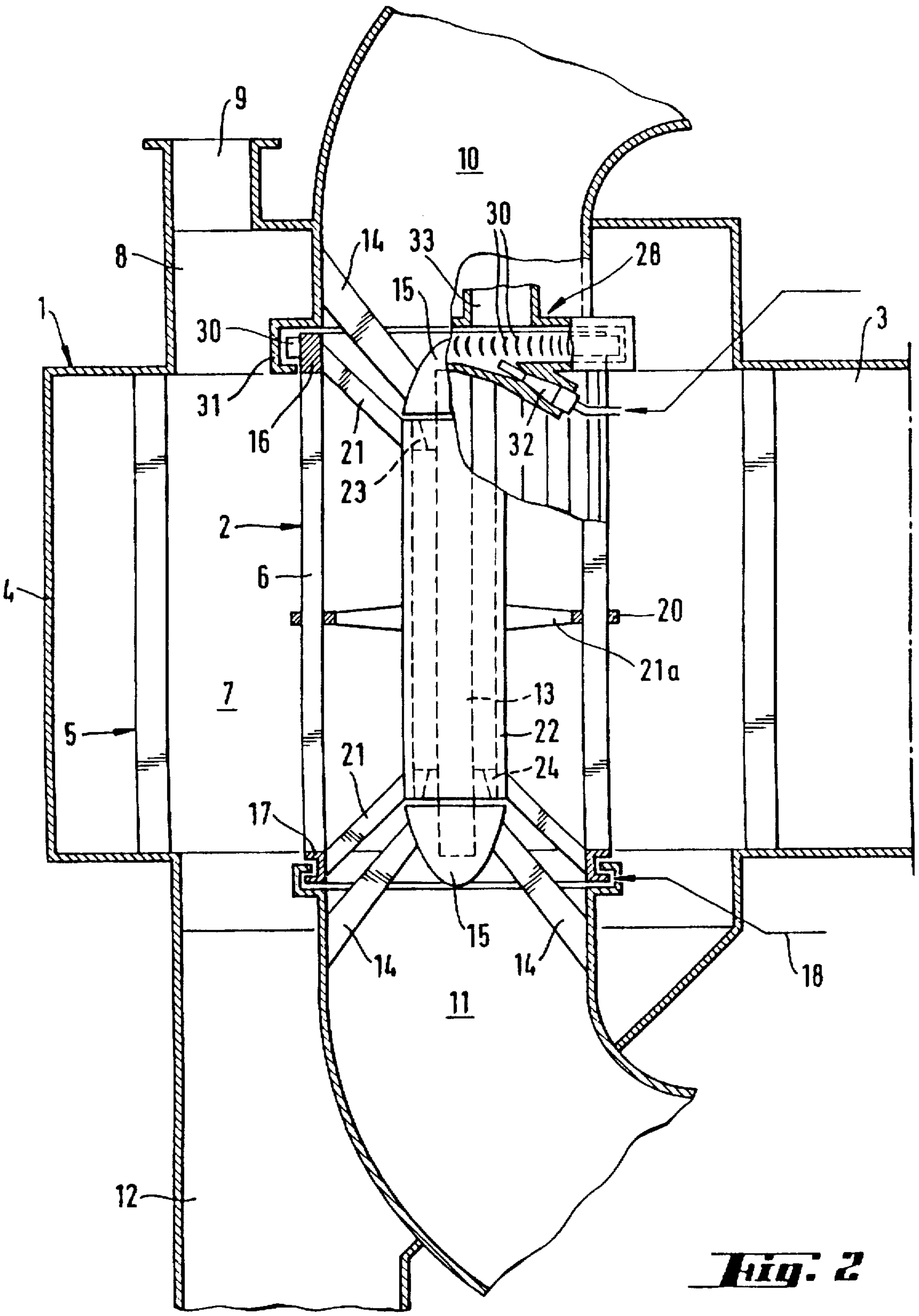
FIG. 2 shows, also schematically in longitudinal section, the embodiment in FIG. 1, with a compressed-air turbine drive.

According to FIG. 2, in the case of a separator according to FIG. 1, the fan wheel 2 is driven by a compressed air turbine 28, which is formed on the outer circumference of the wheel. On the upper end ring 16 there is provided a set of turbine buckets 30 which are surrounded by a turbine housing 31 which has at least one compressed air nozzle 32 directed at the turbine buckets.

With a turbine drive of this kind, an optimal seal is simultaneously achieved. A similar turbine drive can also be provided at the bottom end of the fan wheel. The compressed air issuing from the turbine through an outlet nozzle 33 can also be used, for example, for cooling.

Figure 3:
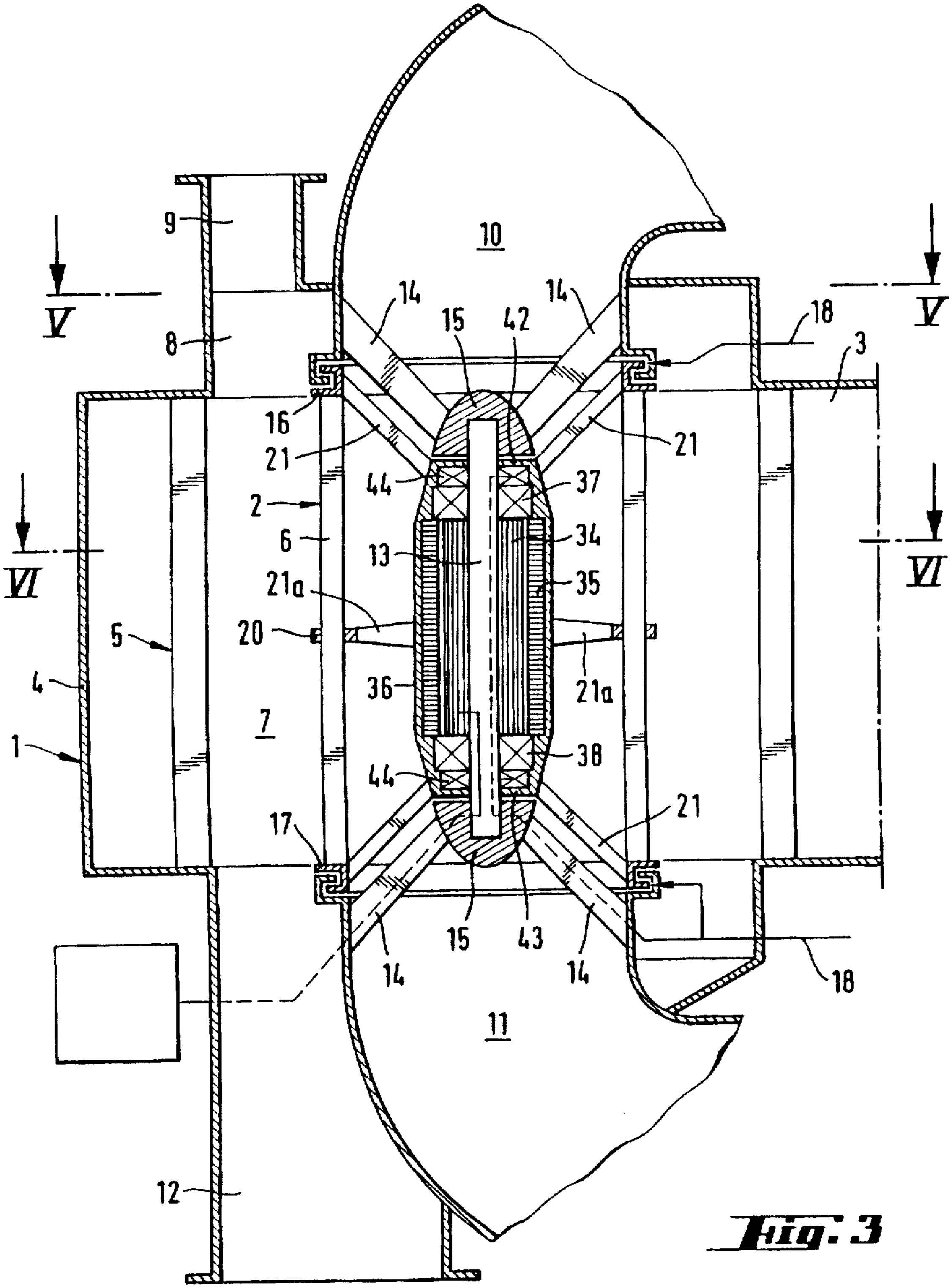
FIG. 3 shows, again schematically in longitudinal section, an embodiment with an electrical external-rotor electric motor drive.

The embodiment in FIG. 3 likewise corresponds to the description given on FIG. 1, and equal parts are given equal reference numbers. In FIG. 3, however, an electromagnetic drive is provided. Such an electromagnetic drive can quite generally be housed within the sleeve 22 shown in FIG. 1 and is preferably in the form of an external-rotor motor.

In FIG. 3, the stator windings 34 are disposed on the axle 13 and form the magnetic poles or magnetic field of the motor. Corresponding rotor poles 35 are mounted on the inside wall of a housing 36 corresponding to the sleeve 22 in FIG. 2. From the housing 36 radial arms 21, 21*a*, extend to the end rings 16 and 17 and the spacer rings 20, as in the case of FIGS. 1 and 2. Upper and lower end walls 42 and 43 are joined to the cylindrical wall of this motor housing. Adjacent the end walls are bearings 37 and 38 and a sealing ring 44 for the fan wheel 2 and its external-rotor drive motor. One of the two bearings is designed as an axial thrust bearing. The bearings can be configured as electromagnetic or aerostatic or also hydrostatic bearings.

The distance between the bearings 37 and 38 is less than the length of the fan wheel 2, in contrast to previous separators having a drive shaft journal ed outside of the separator housing. Due to this short distance between bearings the diameter of the axle can also be short accordingly.

Figure 4:
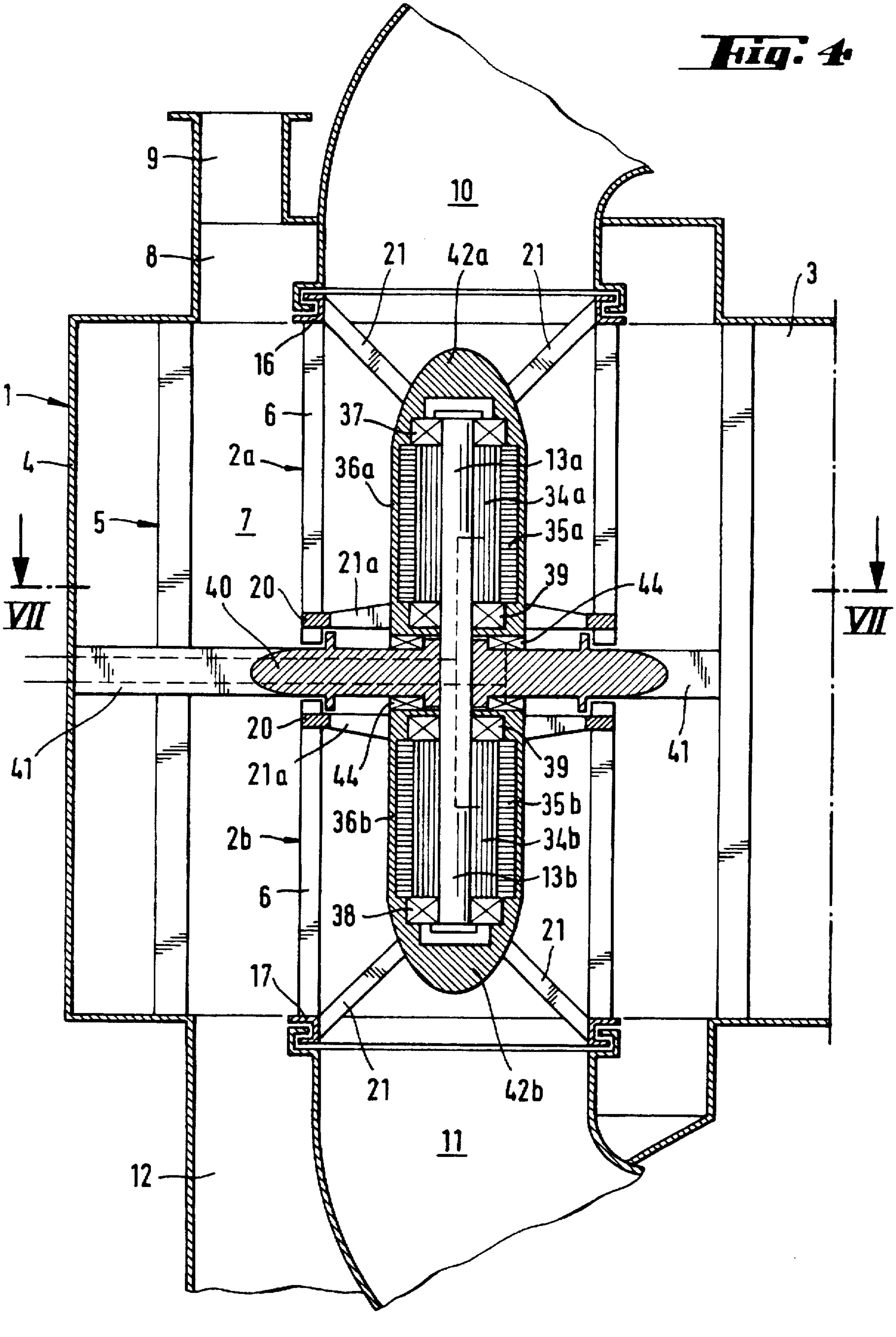
FIG. 4 shows likewise an embodiment with electrical external-rotor drive, wherein a central, radial supporting disk and a ring of supporting arms is provided, from which a load-bearing axle extends half upward and half downward, on each of which a separator wheel is disposed.
Figure 5:
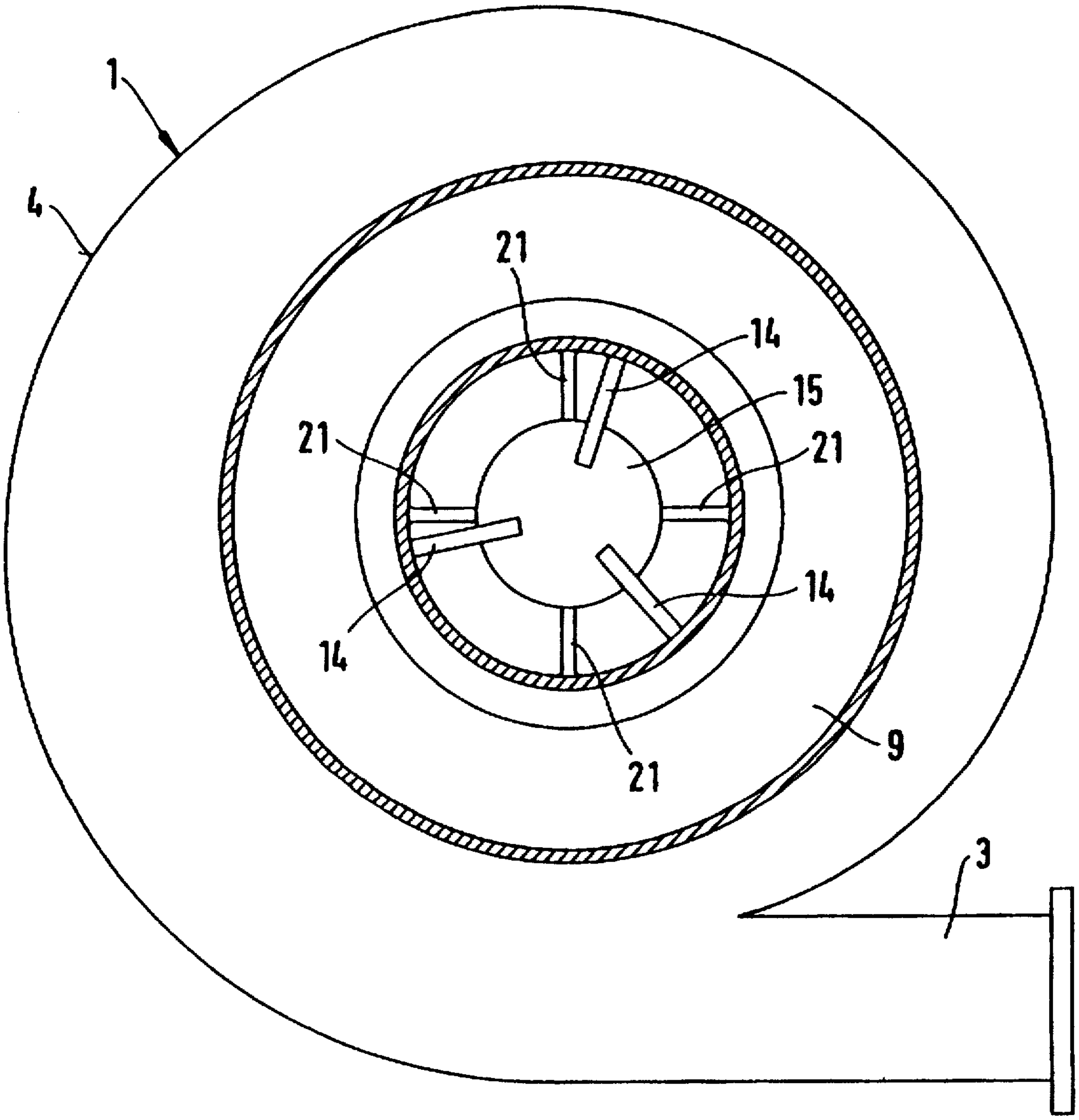
FIGS. 5/6 are cross sections taken on the section lines V—V and VI—VI in FIG. 3.
Figure 6:
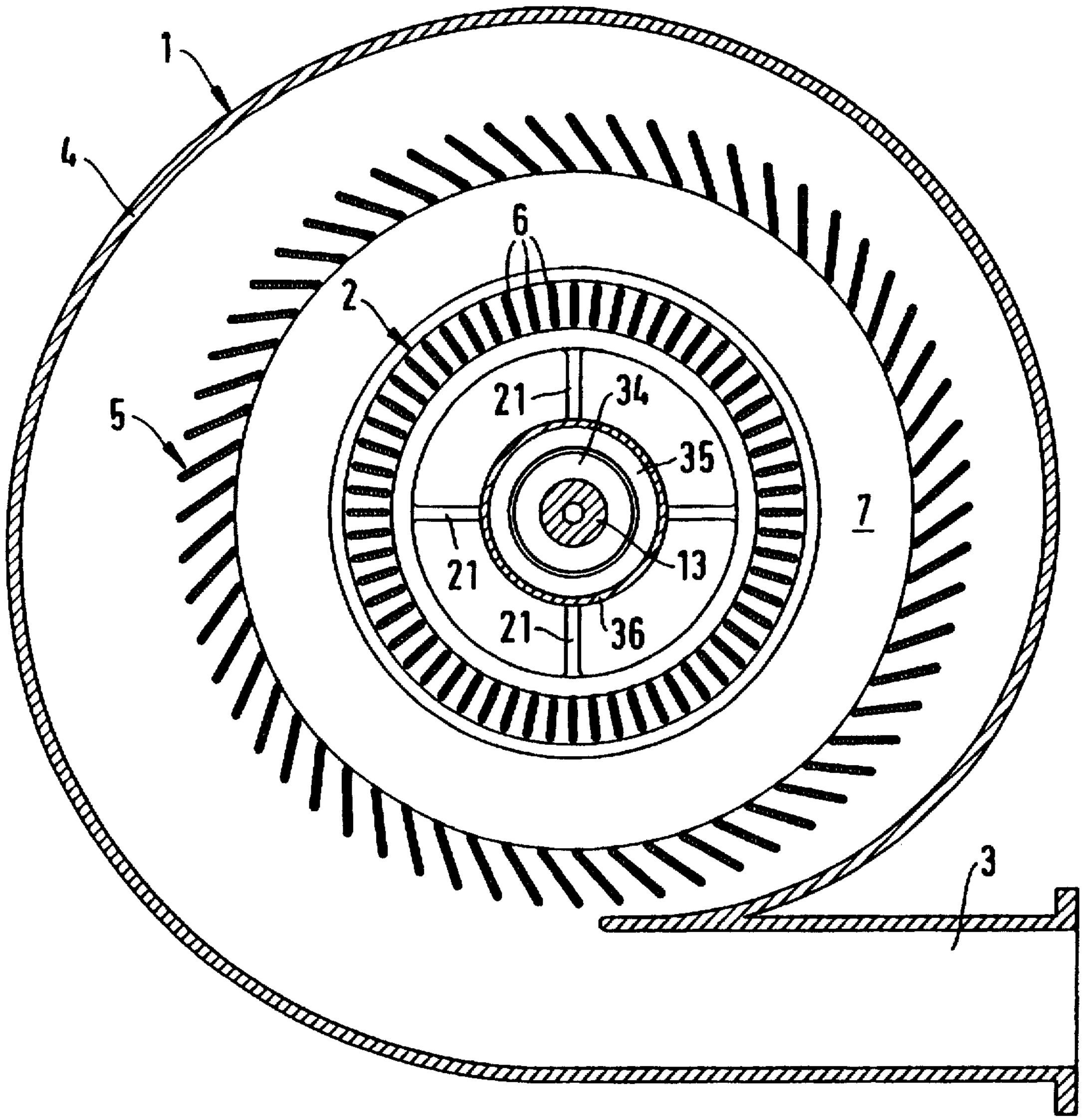
Figure 7:
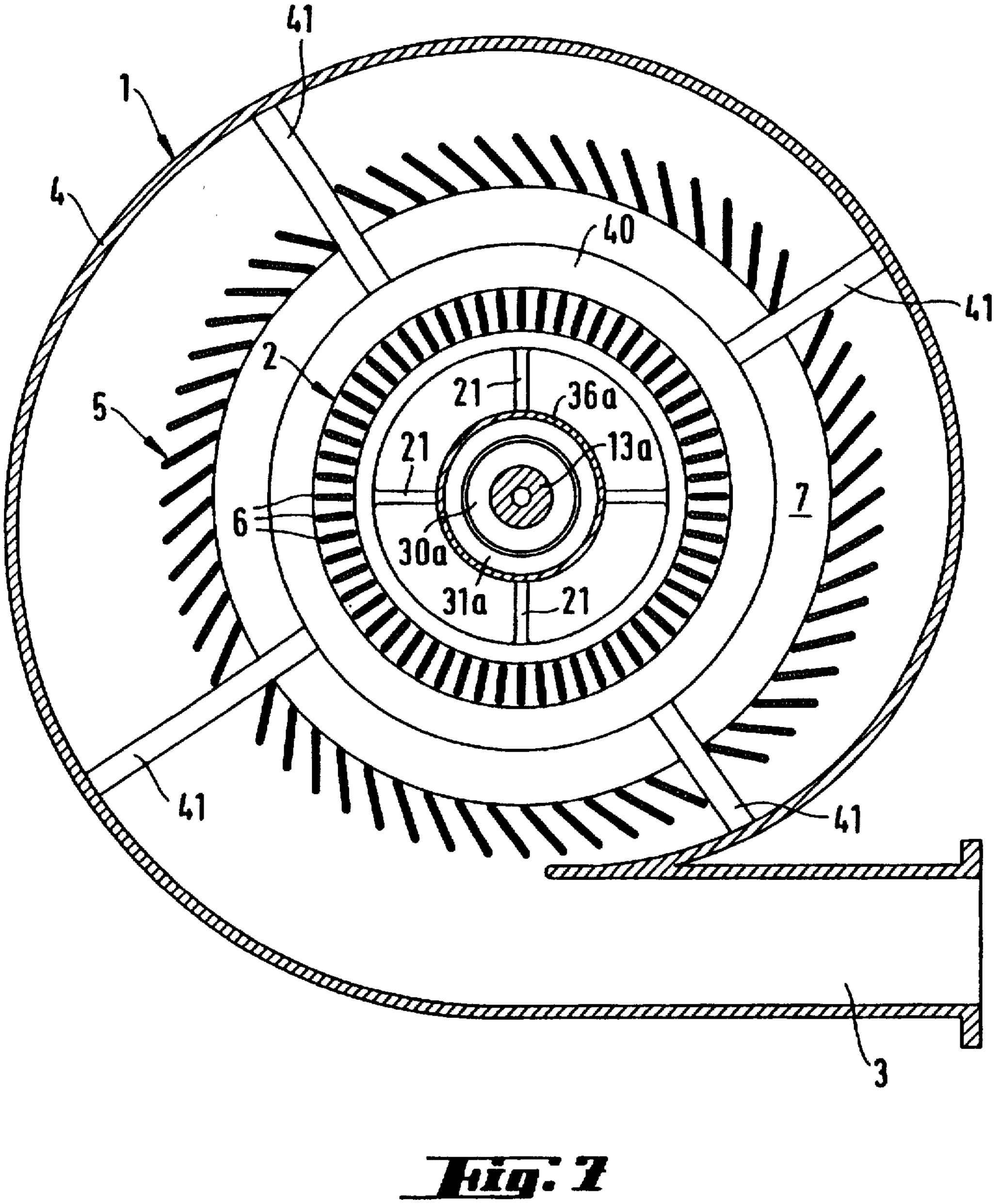
FIG. 7 is the cross section along line VII—VII in FIG. 4.

In the case of the separators according to FIGS. 2 and 3, the radial arms bearing the axle near the outlets can still be considered to interfere with the flow. In the case of the air separator of FIG. 4, however, the axially outer portions of the fan wheel, and especially the outlet chambers adjoining them, are completely free of any machine parts or fittings which might interfere with the flow and the free exit of the mixture of air and fines.

This is accomplished by fastening an axle 13*a*, 13*b*, approximately at the center of its length, to a supporting disk 40 extending radially through the center of the separator or its wheel. This supporting disk 40 divides the separator into two halves. Thus two separators are obtained, which are disposed axially side-by-side or one on top of the other, the upper air-and- fines mixture outlet 10 and being associated with the one wheel 2*a* and the lower air-and-fines mixture with the other wheel 2*b*. This configuration of the means bearing the axle as a radial disk 40 is easily accomplished when the material being separated is delivered together with the air tangentially from the outside. A radial central supporting disk is likewise possible if the separator has a horizontal shaft and the material is fed tangentially from above. If, however, the separator is still upright according to FIG. 4, with a vertical axle, and the material is to be fed through an inlet into an upper annular channel 8, the supporting shaft is provided with a ring of radial supporting arms 41.

The wheel, or two wheel halves 2*a* and 2*b*, is again configured as an electrical external-rotor motor drive. A stator 34*a*, 34*b*, of the external-rotor motor is supported on the lower and upper axles 13*a*, 13*b*; the rotor poles 35*a*, 35*b*, are fastened one on the inside of each casing 36*a*, 36*b*, and the radial arms 21*a* extend to the supporting rings 20 for the wheel buckets.

The bearings 37 and 38 for the upper and lower fan wheels 2*a* and 2*b* and their external-rotor motor drive are formed in the two end covers 42*a* and 42*b* of the motor housing. The bearings are thus fully enclosed within the housing. In the area of the supporting disk 40, the fan wheels 2*a* and 2*b* are journal ed on the axles 13*a* and 13*b* by bearings 39.

Between the supporting disk 40 and each housing ring associated with the latter, seals 44 are provided, to which compressed air is fed through a passage or line.

The upper or the lower half of this air separator can also be configured as one with a unilateral fines-and-air outlet.

What is claimed is:

1. A centrifugal air separator comprising; a substantially cylindrical separator housing, said separator housing being provided with a tangential inlet for air and an inlet for the materials to be separated, or a combined inlet for both the air and the materials to be separated, an outlet for coarse material and at least one outlet for a mixture of air and fines, at least one separator wheel having a diameter smaller than the diameter of the separator housing and formed substantially by rings which bear buckets or blades, wherein the separator wheel is journaled on a central, fixed axle, which is held in the separator housing by supporting means comprising arms or struts, wherein the tangential inlets are disposed such that the mixture of air and fines flows through the rings or blades of the separator wheel in a radial direction from the outside to the inside of the separator wheel, and wherein said outlets for the mixture of air and fines are located adjacent to one end or both ends of the separator wheel.

2. The centrifugal air separator according to claim 1, wherein the separator wheel is journal ed on the axle by means of an electromagnetic mounting.

3. The centrifugal air separator according to claim 1 wherein the fan wheel is journaled on the axle by means of at least one bearing which can be flushed with a fluid.

4. The centrifugal air separator according to claim 1, wherein the separator wheel has on an outer periphery at least one ring of turbine buckets against which at least one turbine nozzle blows air in a circumferential direction.

5. The centrifugal air separator according to claim 1, further comprising an external-rotor motor as a driver, and having a stator which is affixed on the axle, and having a rotor joined by means of radial arms or spokes, to the rings bearing the buckets.

6. The centrifugal air separator according to claim 1, further comprising a central, radial supporting disk or radial ring of supporting arms, from which each half of the axle extends, one in each direction, one fan wheel or fan wheel half being journaled on each of the two axle halves.

7. The centrifugal air separator according to claim 1, further comprising radial arms which bear the axle at each end of the axle, wherein the radial arms bearing the axle are inclined toward one another with respect to the radius.

8. The centrifugal air separator according to claim 1, further comprising radial arms which bear end rings of the separator wheel, wherein the radial arms bearing the end rings of the separator wheel are inclined toward one another with respect to the radius.

9. A centrifugal air separator, comprising;

a substantially cylindrical separator housing, said separator housing being provided with a tangential inlet for air and an inlet for the materials to be separated, or a combined inlet for both the air and the materials to be separated, an outlet for separated coarse material, and at least one outlet for a separated mixture of air and fines, a central, fixed axle held inside the hosing by supporting means comprising arms or struts, at least one separator wheel rotatably journaled on the fixed axle in the housing, said separator wheel comprising a ring which bears buckets or blades, said separator wheel having a diameter smaller than the diameter of the separator housing, means for rotatably driving the separator wheel on the central fixed axle, and wherein the outlets for the separated mixture of air and fines are located adjacent to ends of the separator wheel.

10. The centrifugal air separator according to claim 9, wherein the separator wheel is journaled on the axle by means of an electromagnetic mounting.

11. The centrifugal air separator according to claim 9, wherein the fan wheel is journaled on the axle by means of at least one bearing which can be flushed with a fluid.

12. The centrifugal air separator according to claim 9, wherein the separator wheel has on an outer periphery at least one ring of turbine buckets against which at least one turbine nozzle blows air in a circumferential direction.

13. The centrifugal air separator according to claim 9, further comprising an external-rotor motor as a driver, and having a stator which is affixed on the axle, and having a rotor joined by means of radial arms or spokes, to the rings bearing the buckets.

14. The centrifugal air separator according to claim 9, further comprising a central, radial supporting disk or radial ring of supporting arms, and wherein the fixed central axle and at least one fan wheel comprise two halves, each half of the axle extending from the radial supporting disk or radial ring of support arms, one half in each direction, one fan wheel or fan wheel half being journaled on each of the two axle halves.

15. The centrifugal air separator according to claim 9, further comprising radial arms bearing the axle, wherein the radial arms bearing the axle are inclined toward one another with respect to the radius.

16. The centrifugal air separator according to claim 9,further comprising radial arms bearing end rings of the separator wheel wherein the radial arms bearing the end rings of the separator wheel are inclined toward one another with respect to the radius.

* * * * *